(12) United States Patent
Oishi et al.

(10) Patent No.: US 9,901,873 B2
(45) Date of Patent: Feb. 27, 2018

(54) $CO_2$ RECOVERY DEVICE AND $CO_2$ RECOVERY METHOD

(71) Applicant: MITSUBISHI HEAVY INDUSTRIES, LTD., Tokyo (JP)

(72) Inventors: Tsuyoshi Oishi, Tokyo (JP); Hiromitsu Nagayasu, Tokyo (JP); Hiroshi Tanaka, Tokyo (JP); Takuya Hirata, Tokyo (JP); Takashi Kamijo, Tokyo (JP); Daisuke Shimada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 221 days.

(21) Appl. No.: 14/420,248

(22) PCT Filed: Jul. 31, 2013

(86) PCT No.: PCT/JP2013/070810
§ 371 (c)(1),
(2) Date: Feb. 6, 2015

(87) PCT Pub. No.: WO2014/024757
PCT Pub. Date: Feb. 13, 2014

(65) Prior Publication Data
US 2015/0217227 A1    Aug. 6, 2015

(30) Foreign Application Priority Data
Aug. 9, 2012    (JP) .................................. 2012-177389

(51) Int. Cl.
*B01D 53/14*    (2006.01)
*B01D 53/62*    (2006.01)
(Continued)

(52) U.S. Cl.
CPC .......... *B01D 53/62* (2013.01); *B01D 19/0015* (2013.01); *B01D 19/0042* (2013.01);
(Continued)

(58) Field of Classification Search
CPC ............ B01D 19/0015; B01D 19/0042; B01D 2252/204; B01D 2252/20478;
(Continued)

(56) References Cited

U.S. PATENT DOCUMENTS 3,929,434 A    12/1975  Nelson
5,308,384 A     5/1994  Kapanen et al.
(Continued)

FOREIGN PATENT DOCUMENTS

DE    44 01 183 A1    8/1994
EP    0 954 369 A1   11/1999
(Continued)

OTHER PUBLICATIONS

Notice of Acceptance dated May 30, 2016, issued in counterpart Australian Patent Application No. 2013300659. (3 pages).
(Continued)

*Primary Examiner* — Cabrena Holecek
(74) *Attorney, Agent, or Firm* — Westerman, Hattori, Daniels & Adrian, LLP

(57) ABSTRACT

$CO_2$ absorber includes a $CO_2$ absorbing section in which a $CO_2$-containing flue gas and a $CO_2$ absorbent are brought into contact with each other to remove $CO_2$, and an aqueous cleaning section in which a decarbonated flue gas and rinsing water are brought into contact with each other to remove an accompanying substance. A lean solution is re-used in the absorber. The $CO_2$ recovery device includes a degassing basin which is interposed in a rich solution supply line that supplies the rich solution from the $CO_2$ absorber to the absorbent regenerator, and which includes a retaining section configured to remove oxygen in the rich solution.

4 Claims, 4 Drawing Sheets

(51) Int. Cl.
  *B01D 53/78* (2006.01)
  *C01B 31/20* (2006.01)
  *B01D 19/00* (2006.01)

(52) U.S. Cl.
  CPC ..... *B01D 53/1425* (2013.01); *B01D 53/1475* (2013.01); *B01D 53/78* (2013.01); *C01B 31/20* (2013.01); *B01D 2252/204* (2013.01); *B01D 2252/20478* (2013.01); *B01D 2257/104* (2013.01); *B01D 2258/0283* (2013.01); *Y02C 10/04* (2013.01); *Y02C 10/06* (2013.01); *Y02P 20/152* (2015.11)

(58) Field of Classification Search
  CPC ...... B01D 2257/104; B01D 2258/0283; B01D 2258/1425; B01D 2258/1475; B01D 2258/62; B01D 2258/78; C01B 31/20; Y02C 10/04; Y02C 10/06; Y02P 20/152
  See application file for complete search history.

(56) References Cited

U.S. PATENT DOCUMENTS

| | | | |
|---|---|---|---|
| 6,146,603 A | 11/2000 | Chakravarti et al. | |
| 2007/0186772 A1* | 8/2007 | Hoffmann | B01D 19/0057 95/261 |
| 2010/0139491 A1 | 6/2010 | Ingvast et al. | |
| 2011/0168019 A1 | 7/2011 | Northrop et al. | |
| 2012/0269690 A1* | 10/2012 | Iijima | B01D 53/1418 422/168 |

FOREIGN PATENT DOCUMENTS

| | | |
|---|---|---|
| JP | S55-39210 A | 3/1980 |
| JP | S58-190500 U | 12/1983 |
| JP | S59-86205 U | 6/1984 |
| JP | H03-69688 | 3/1991 |
| JP | 06-071109 A | 3/1994 |
| JP | H7-192162 A | 7/1995 |
| JP | 2001-025628 A | 1/2001 |
| JP | 2002-501991 A | 1/2002 |
| JP | 2002-126439 A | 5/2002 |
| JP | 2007-137725 A | 6/2007 |
| JP | 2010-253370 A | 11/2010 |
| JP | 2012-223730 A | 11/2012 |
| JP | 2012-236166 A | 12/2012 |
| WO | 2007/009461 A2 | 1/2007 |

OTHER PUBLICATIONS

Office Action dated May 31, 2016, issued in counterpart Japanese Patent Application No. 2012-177389, with English translation. (10 pages).
Decision to Grant a Patent dated Aug. 30, 2016, issued in counterpart Japanese Patent Application No. 2012-177389, with English translation. (5 pages).
International Search Report dated Nov. 5, 2013, issued in corresponding application No. PCT/JP2013/070810.
Written Opinion dated Nov. 5, 2013, issued in corresponding application No. PCT/JP2013/070810.
Notice of Allowance dated Oct. 12, 2016, issued in counterpart Canadian Application No. 2,881,159. (1 page).
Extended (Supplementary) Search Report dated Apr. 12, 2016, issued in European Patent Application No. 13827456.8 (12 pages).
Translation of Written Opinion dated Nov. 5, 2013, issued in corresponding Application No. PCT/JP2013/070810 (8 pages).

* cited by examiner

CO₂ RECOVERY DEVICE AND CO₂ RECOVERY METHOD

FIELD

The present invention relates to a $CO_2$ recovery device and a $CO_2$ recovery method which are capable of reliably performing degassing of oxygen from a rich solution and in which re-trapping of air bubbles does not occur.

BACKGROUND

As one cause of the global warming phenomenon, the greenhouse effect due to $CO_2$ has been pointed out, and a countermeasure thereof has internationally becoming an urgent business to protect a global environment. The cause of $CO_2$ generation includes all human activity fields in which fossil fuels are combusted, and a demand for suppressing discharge of $CO_2$ has becoming stronger. In accompany with this, with respect to power generating facility such as a thermal power plant in which a large amount of fossil fuels are used, a method, in which a flue gas of a boiler is brought into contact with an amine-based absorbent such as an aqueous amine compound solution to remove and recover $CO_2$ in the flue gas, has been intensively studied.

A method, in which $CO_2$ is removed from the flue gas in an absorptive manner by using the absorbent as described above, $CO_2$ is collected in a desorption manner, and the absorbent is regenerated and is circulated again to a $CO_2$ absorber to be used again, is disclosed (for example, refer to Patent Literature 1).

However, a $CO_2$-containing gas and the absorbent come into counterflow contact, and an amount of oxygen contained in air bubbles, which are trapped in the absorbent, is larger than an amount of dissolved oxygen. Accordingly, a degassing technology of removing oxygen from the absorbent by using, for example, a liquid cyclone and the like has been suggested (for example, Patent Literature 2).

CITATION LIST

Patent Literature

Patent Literature 1: Japanese Patent Application Laid-open No. 2002-126439
Patent Literature 2: Japanese Patent Application Laid-open No. 2010-253370

SUMMARY

Technical Problem

However, in the liquid cyclone and the like which remove air bubbles trapped in the absorbent in the $CO_2$ absorber, as disclosed in Patent Literature 2, there is a problem that a swirling flow occurs, and thus re-trapping of air bubbles (air) occurs.

Accordingly, it is desired to realize a $CO_2$ recovery technology which is capable of reliably performing degassing of oxygen from a rich solution, and in which re-trapping of air bubble does not occur.

The invention has been made in consideration of the above-described problem, and an object thereof is to provide a $CO_2$ recovery device and a $CO_2$ recovery method which are capable of reliably performing degassing of oxygen from a rich solution and in which re-trapping of air bubbles does not occur.

Solution to Problem

According to a first aspect of the present invention, there is provided a $CO_2$ recovery device, including: a $CO_2$ absorber including a $CO_2$ absorbing section in which a flue gas and a basic amine compound absorbent are brought into contact with each other to allow $CO_2$ in the flue gas to be absorbed in the basic amine compound absorbent, and an aqueous cleaning section in which a decarbonated flue gas, from which $CO_2$ is removed in the $CO_2$ absorbing section, and rinsing water are brought into contact with each other to remove an accompanying substance that accompanies the decarbonated flue gas; an absorbent regenerator that separates $CO_2$ from a rich solution to which $CO_2$ is already absorbed, and regenerates the basic amine compound absorbent into a lean solution; and a degassing basin that is interposed in a rich solution supply line that supplies the rich solution from the $CO_2$ absorber to the absorbent regenerator, and includes a retaining section configured to remove oxygen in the rich solution, wherein the lean solution from which $CO_2$ is already removed is re-used as the basic amine compound absorbent in the $CO_2$ absorber.

According to a second aspect of the present invention, there is provided the $CO_2$ recovery device according to the first aspect, wherein the degassing basin includes the retaining section that removes oxygen in the rich solution by floating separation, a partition wall that allows the rich solution, from which oxygen is removed in the retaining section, to fall along a wall surface, and a storage section that stores the rich solution which falls along the partition wall and from which oxygen is removed.

According to a third aspect of the present invention, there is provided the $CO_2$ recovery device according to the first or second aspect, further including: a purge gas introducing unit that purges a gas, which does not contain oxygen, into the degassing basin.

According to a fourth aspect of the present invention, there is provided the $CO_2$ recovery device according to any one of the first to third aspects, further including: a degassing tower that is provided on a downstream side of the degassing basin, and further degasses the rich solution, from which oxygen is removed, in a decompressed state.

According to a fifth aspect of the present invention, there is provided the $CO_2$ recovery device according to any one of the first to fourth aspects, further including: a heat exchange unit that is provided on an upstream side of the degassing basin, and heats the rich solution.

According to a sixth aspect of the present invention, there is provided a $CO_2$ recovery method which uses a $CO_2$ absorber that brings a $CO_2$-containing flue gas that contains $CO_2$ and an basic amine compound into contact with each other to remove $CO_2$, and an absorbent regenerator that separates $CO_2$ from the basic amine compound that absorbs $CO_2$ to regenerate a $CO_2$ absorbent, and which re-uses a lean solution, from which $CO_2$ is already removed in the absorbent regenerator, in the $CO_2$ absorber, the method including: removing oxygen in the rich solution by floating separation while retaining the rich solution for a predetermined time.

According to a seventh aspect of the present invention, there is provided the $CO_2$ recovery method according to the sixth aspect, wherein the rich solution, from which oxygen is removed, is allowed to fall along a partition wall to remove dissolved oxygen, and the resultant rich solution is stored in a storage section.

According to an eighth aspect of the present invention, there is provided the $CO_2$ recovery method according to the sixth or seventh aspect, wherein oxygen, which remains in the rich solution from which oxygen is removed, is further removed under decompressed conditions.

According to a ninth aspect of the present invention, there is provided the $CO_2$ recovery method according to any one of the sixth to eighth aspects, wherein the rich solution is heated before the retention.

Advantageous Effects of Invention

According to the invention, a degassing layer including a retaining section is provided, and thus air bubbles that are tapped in a rich solution can be reliably removed when the rich solution is transported from a $CO_2$ absorber to a regenerator. Accordingly, it is possible to reduce an oxygen concentration in a $CO_2$ gas recovered from the regenerator.

DESCRIPTION OF EMBODIMENTS

Hereinafter, preferred examples of the invention will be described in detail with reference to the attached drawings. In addition, the invention is not limited to these examples, and in a case where a plurality of examples are present, the invention may be configured in combination of the examples.

Example 1

Figure 1:
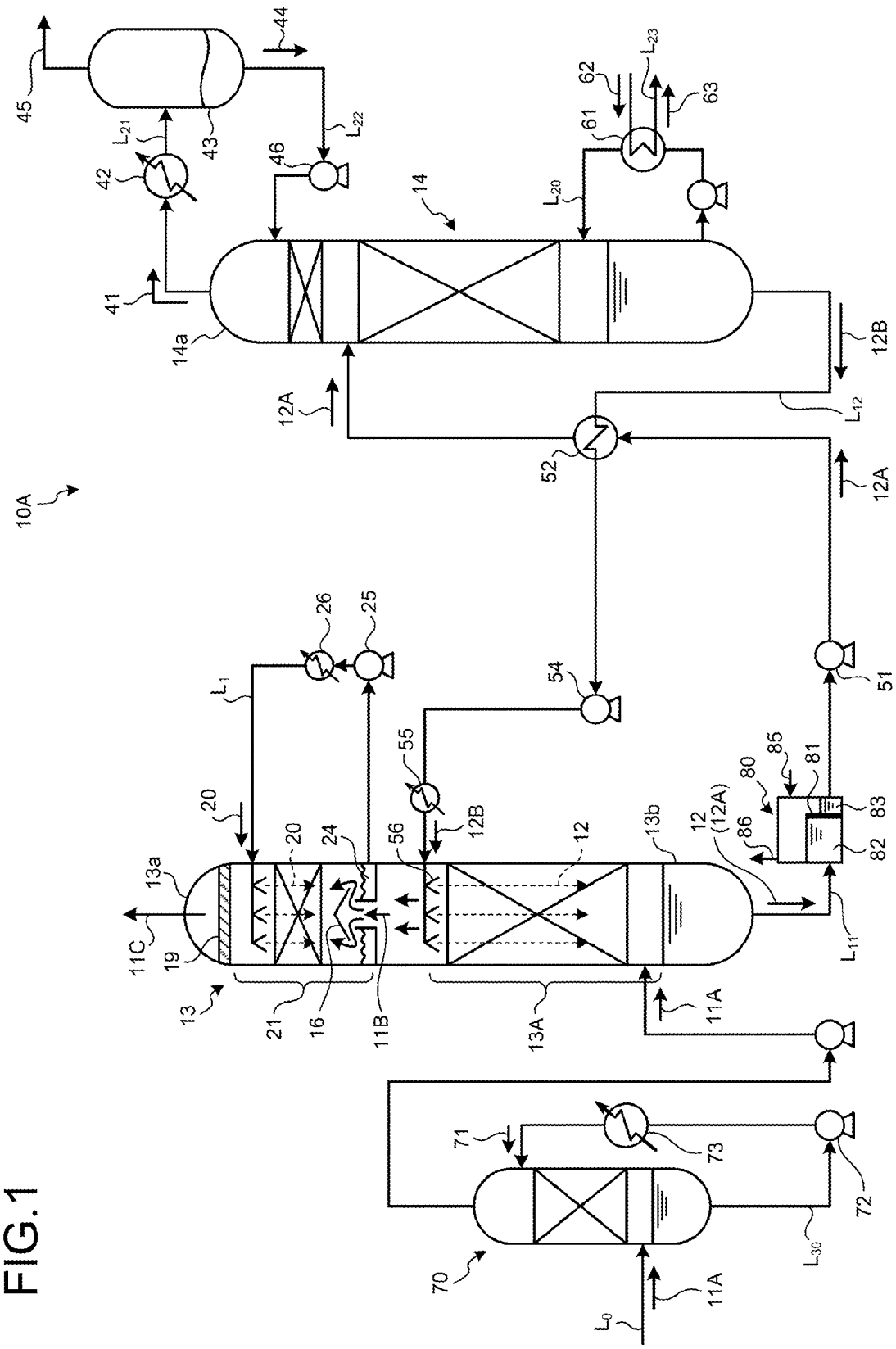
FIG. 1 is a schematic view of a $CO_2$ recovery device according to Example 1.

A $CO_2$ recovery device according to an example of the invention will be described with reference to the attached drawings. FIG. 1 is a schematic view of a $CO_2$ recovery device according to Example 1.

As illustrated in FIG. 1, a $CO_2$ recovery device 10A according to this example is provided with a $CO_2$ absorber (hereinafter, referred to as an "absorber") 13 and an absorbent regenerator (hereinafter, referred to as a "regenerator") 14 that regenerates a $CO_2$ absorbent (rich solution 12A) that has absorbed $CO_2$. The $CO_2$ absorber 13 includes a $CO_2$ absorbing section 13A in which a $CO_2$-containing flue gas 11A that contains $CO_2$ and a $CO_2$ absorbent (hereinafter, referred to as an "absorbent") 12 that is a basic amine compound absorbent are brought into contact with each other to remove $CO_2$, and an aqueous cleaning section 21 in which a decarbonated flue gas 11B, from which $CO_2$ is already removed in the $CO_2$ absorbing section 13A, and rinsing water 20 are brought into contact with each other to remove an accompanying substance that accompanies the decarbonated flue gas 11B. A lean solution 12B, from which $CO_2$ is already removed in the regenerator 14, is re-used in the absorber 13. The $CO_2$ recovery device includes a degassing basin 80 which is interposed in a rich solution supply line $L_{11}$ that supplies the rich solution 12A from the $CO_2$ absorber 13 to the absorbent regenerator 14, and which includes a retaining section 82 configured to remove oxygen in the rich solution 12A.

The decarbonated flue gas 11B, from which $CO_2$ is absorbed and removed with the absorbent 12 in the $CO_2$ absorbing section 13A, rises up toward the aqueous cleaning section 21 side.

In addition, in the aqueous cleaning section 21, the rinsing water 20 falls down from a tower top side through a nozzle and comes into counterflow contact with and rinses the decarbonated flue gas 11B that rises up, and the rinsing water 20 is recovered in a solution storage section 24.

The rinsing water 20, which is recovered, is circularly used with a circulation pump 25 interposed in a circulation rinsing water line $L_1$. In addition, the rinsing water 20 is cooled down to a predetermined temperature with a cooling unit 26 that is interposed in the circulation rinsing water line $L_1$.

In this example, a rich and lean solution heat exchanger 52, which performs heat exchange between the rich solution 12A and the lean solution 12B from which $CO_2$ is already removed, is provided.

In FIG. 1, a reference sign 13a represents a tower top portion, a reference sign 13b represents a tower bottom portion, a reference sign 19 represents a mist eliminator that traps mist in a gas, a reference sign 51 represents a rich solution pump, a reference sign 54 represents a lean solution pump, a reference sign $L_0$ represents a gas introduction line for the $CO_2$-containing flue gas 11A, a reference sign $L_{11}$ represents a rich solution supply line, and a reference sign $L_{12}$ represents a lean solution supply line.

In the absorber 13, the $CO_2$-containing flue gas 11A comes into counterflow contact with, for example, an amine-based absorbent 12 that contains alkanolamine as a base, in the $CO_2$ absorbing section 13A that is provided on a lower portion side of the absorber 13, and $CO_2$ in the $CO_2$-containing flue gas 11A is absorbed to the $CO_2$ absorbent 12 by a chemical reaction (R—$NH_2$+$H_2O$+$CO_2$→R—$NH_3HCO_3$).

As a result, almost none of $CO_2$ remains in the decarbonated flue gas 11B that passes through the $CO_2$ absorbing section 13A and rises up at the inside of the absorber 13.

Then, the decarbonated flue gas 11B rises up toward the aqueous cleaning section 21 through a chimney tray 16, and comes into gas-liquid contact with the rinsing water 20 supplied from the tower top side of the aqueous cleaning section 21, and the $CO_2$ absorbent 12 that accompanies the decarbonated flue gas 11B is recovered by circulation rinsing.

In the aqueous cleaning section 21, the rinsing water 20 that is stored in the solution storage section 24 of the chimney tray 16 is circulated through the circulation rinsing water line $L_1$ for circulation rinsing.

In addition, a cooling unit 26 is provided to the circulation rinsing water line $L_1$ to cool down the rinsing water 20 to a predetermined temperature (for example, 40° C. or lower).

The rich solution 12A that absorbs $CO_2$ in the absorber 13 is withdrawn from the tower bottom portion 13b, is subjected to pressure-rising by the rich solution pump 51 interposed in the rich solution supply line $L_{11}$, and is supplied to a top portion side of the regenerator 14.

In this example, the degassing basin 80 is interposed in the rich solution supply line $L_{11}$ that feeds the rich solution 12A, which absorbs $CO_2$ and is withdrawn from the tower bottom portion 13b of the absorber 13, toward the regenerator 14.

Figure 2:
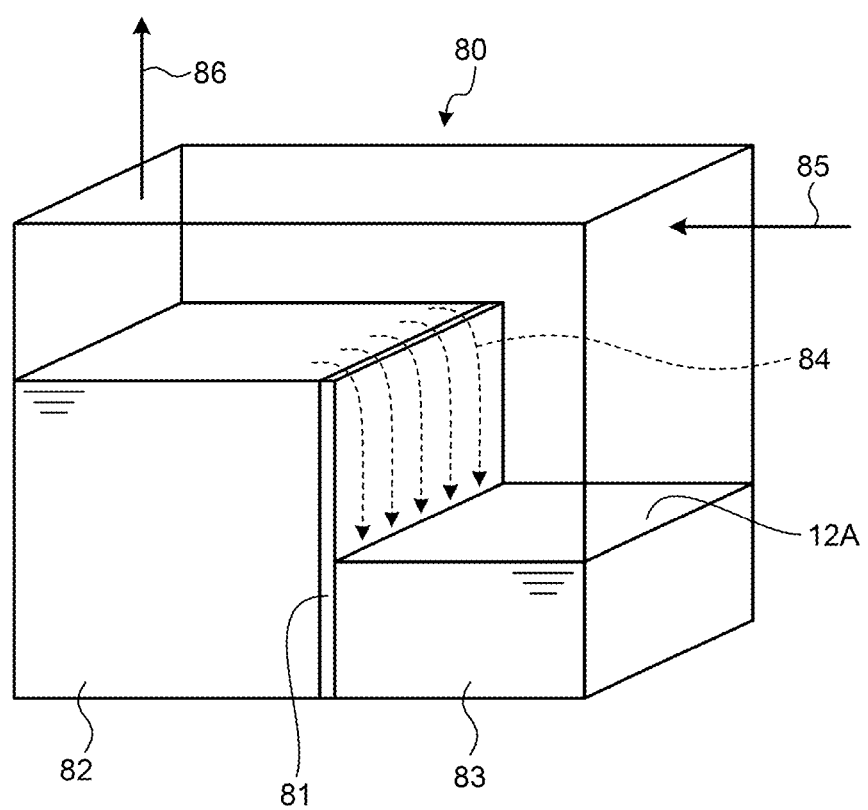
FIG. 2 is a perspective view of a degassing basin according to Examples.

FIG. 2 is a perspective view of the degassing basin according to this example.

As illustrated in FIG. 2, the degassing basin 80 includes a retaining section 82 that removes oxygen in the rich solution 12A, and reliably performs degassing of oxygen in the rich solution 12A by retaining the rich solution 12A in the retaining section 82 for a predetermined time.

In addition, at least one sheet of partition wall 81 is provided to the degassing basin 80, and thus the degassing basin 80 includes the retaining section 82 and a storage section 83.

In addition, the rich solution 12A, from which oxygen is floatation-separated due to retention for a predetermined time, is subjected to gravity fall 84 over the partition wall 81 along a wall surface of the partition wall 81.

The gravity fall 84 is set to gradually occur along the wall, and thus separation of oxygen in the rich solution 12A also occurs even during the gravity fall 84.

In addition, when being stored in the storage section 83, the rich solution 12A from which oxygen is degassed is subjected to pressure-rising by the rich solution pump 51 and is supplied toward the top portion of the regenerator 14.

As a result, since the degassing basin 80 including the retaining section 82 is provided to the rich solution supply line $L_{11}$ which feeds the rich solution 12A toward the regenerator 14, it is possible to reliably remove air bubbles that are trapped in the rich solution 12A during feeding from the absorber 13 to the regenerator 14. Accordingly, it is possible to reduce an oxygen concentration in the $CO_2$ gas that is recovered from the regenerator 14.

That is, in the case of the degassing in a swirling type cyclone and the like of the related art, air bubbles are re-trapped after degassing due to occurrence of a swirling flow, and thus it is difficult to perform complete degassing. However, in this example, floatation separation is performed for a predetermined time in the retaining section 82, and thus degassing is reliably performed.

Furthermore, the inside is purged with a gas 85 that does not contain oxygen. Accordingly, even when air bubbles are generated during falling down, since a gas that does not contain oxygen is trapped, re-trapping of oxygen is prevented from occurring.

In this example, the one sheet of partition wall 81 is provided, and thus one piece of the retaining section 82 is formed. However, the invention is not limited thereto, and two or more sheets of the partition walls 81 may be provided to increase a retention time with two or more retaining sections 82 so as to improve flotation separation efficiency of air bubbles from the rich solution 12A.

Here, a retention time of the rich solution 12A in the retaining section 82 may be set to, for example, approximately 30 minutes to two hours for flotation separation of air bubbles that remain in the rich solution 12A.

In addition, the gas 85 that does not contain oxygen is introduced into the degassing basin 80 from a purge gas introduction unit (not illustrated) to allow the inside of the degassing basin 80 to enter an approximately oxygen-free state.

As the gas 85 that does not contain oxygen, for example, a gas in which an oxygen concentration is less than 1%, a nitrogen gas, or a $CO_2$ gas which is recovered may be used.

The gas 85 that does not contain oxygen is introduced from a storage section 83 side so as to come into counterflow contact with the rich solution 12A, and is discharged to the outside as a flue gas 86 from an upper side of the retaining section 82.

In addition, the rich solution 12A, which is released from the top side of the regenerator 14 into the inside thereof, emits the majority of $CO_2$ due to heating by water vapor from the tower bottom portion. The $CO_2$ absorbent 12 from which parts or the majority of $CO_2$ is emitted in the regenerator 14 is called "semi-lean solution". The semi-lean solution (not illustrated) becomes a lean solution 12B from which almost all of $CO_2$ is removed when flowing down to the bottom portion of the regenerator 14. The lean solution 12B may be obtained by heating with saturated water vapor 62 in a regenerating heater 61 that is interposed in a circulation line $L_{20}$. The saturated water vapor 62 after heating becomes water vapor concentrated water 63. The water vapor concentrated water 63 is discharged to the outside from a discharge line $L_{23}$.

On the other hand, a $CO_2$ gas 41 accompanied with water vapor, which is dissipated from the rich solution 12A and the semi-lean solution (not illustrated) at the inside of the regenerator 14, is emitted from the tower top portion 14a of the regenerator 14.

In addition, the $CO_2$ gas 41 accompanied with water vapor is guided by a gas discharge line $L_{21}$, the water vapor is condensed in a cooling unit 42 interposed in the gas discharge line $L_{21}$, and concentrated water 44 is separated in a separation drum 43. Then, a $CO_2$ gas 45 is discharged to the outside of a system from the separation drum 43, and then subsequent processes such as separate compression and recovery are performed.

The concentrated water 44 that is separated in the separation drum 43 is supplied to an upper portion of the regenerator 14 by a condensed water circulation pump 46 interposed in a condensed water line $L_{22}$.

Incidentally, although not illustrated in the drawing, some of the concentrated water 44 may be supplied to the circulation rinsing water line $L_1$ and may be used as the rinsing water 20 of the $CO_2$ absorbent 12 that accompanies an outlet gas 11C.

The regenerated $CO_2$ absorbent (lean solution 12B) is transferred toward the absorber 13 through the lean solution supply line $L_{12}$ by the lean solution pump 54 and is circularly used as the $CO_2$ absorbent 12. At this time, the lean solution 12B is cooled down to a predetermined temperature by a cooling unit 55, and is supplied to the inside of the $CO_2$ absorbing section 13A through a nozzle 56.

Accordingly, the $CO_2$ absorbent 12 forms a closed route for circulation between the absorber 13 and the regenerator 14, and is re-used in the $CO_2$ absorbing section 13A of the absorber 13. In addition, the $CO_2$ absorbent 12 may be supplied through a supply line (not illustrated) as necessary, or the $CO_2$ absorbent 12 may be regenerated by a reclaimer (not illustrated) as necessary.

In addition, the $CO_2$-containing flue gas 11A, which is supplied to the $CO_2$ absorber 13, is cooled down with a coolant 71 in a cooling tower 70 provided on a front side thereof, and is introduced into the absorber 13. In addition, a part of the coolant 71 may be also supplied as the rinsing water 20 of the absorber 13 to the top portion of the aqueous cleaning section 21 to be used for rinsing of the $CO_2$ absorbent 12 that accompanies the decarbonated flue gas 11B. In addition, a reference sign 72 represents a circulation pump, a reference sign 73 represents a cooling unit, and a reference sign $L_{30}$ represents a circulation line.

In this example, the degassing basin 80 including the retaining section 82 is provided, and thus it is possible to reliably remove air bubbles including oxygen, which are trapped at the inside of the absorber 13, with natural flotation separation. As a result, it is possible to reduce an oxygen concentration in the $CO_2$ gas recovered from the regenerator 14.

Example 2

Figure 3:
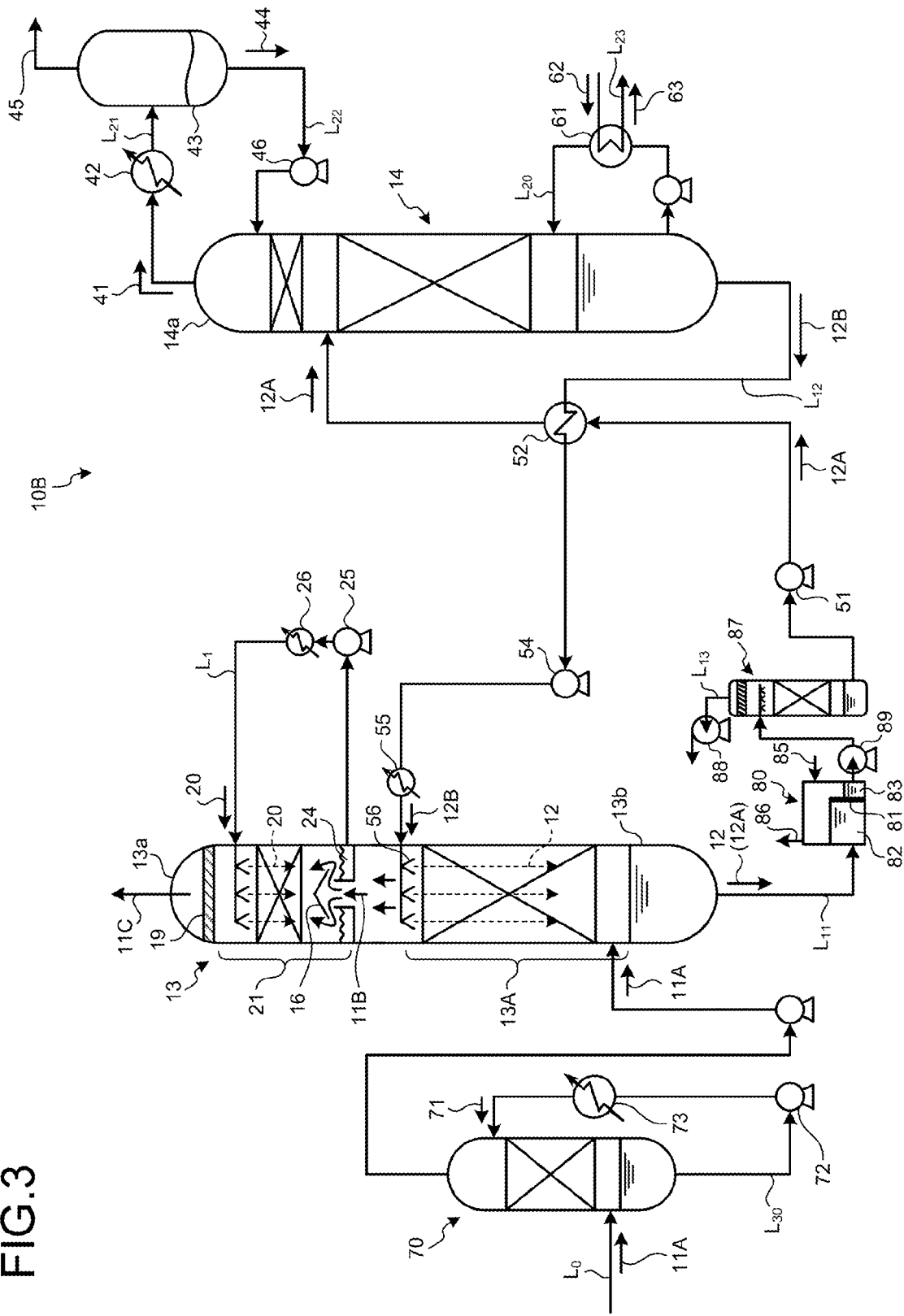
FIG. 3 is a schematic view of a $CO_2$ recovery device according to Example 2.

A $CO_2$ recovery device according to this example of the invention will be described with reference to the attached drawings. FIG. 3 is a schematic view of the $CO_2$ recovery device according to Example 2.

As illustrated in FIG. 3, a $CO_2$ recovery device 10B according to this example is further provided with a degassing tower 87 on a downstream side of the degassing basin 80 in comparison to the $CO_2$ recovery device 10A of Example 1 as illustrated in FIG. 1.

The degassing tower 87 includes a decompression pump 88 in an exhaust line $L_{13}$ to further degasses oxygen, which remains in the rich solution 12A, by allowing the inside of the degassing tower 87 to enter a negative pressure state.

The rich solution 12A, from which oxygen is further degassed in the degassing tower 87, is subjected to pressure-rising by the rich solution pump 51 and is supplied toward the top portion of the regenerator 14.

In this example, since the degassing tower 87, of which the inside can be allowed to enter a decompressed state by a decompression unit, is provided on a downstream side of the degassing basin 80, it is possible to reliably remove air bubbles that remain without being degassed in the degassing basin 80, and thus it is possible to further reduce the oxygen concentration in the $CO_2$ gas recovered from the regenerator 14 in comparison to Example 1.

For example, in a case where the oxygen concentration in the rich solution 12A becomes approximately 10 ppm due to the provision of the degassing basin 80, if the degassing tower 87 is provided, the oxygen concentration can be reduced, for example, to 0.1 ppm or less. A reference sign 89 represents a pump that feeds the rich solution 12A from the degassing basin 80 to the degassing tower 87.

Example 3

Figure 4:
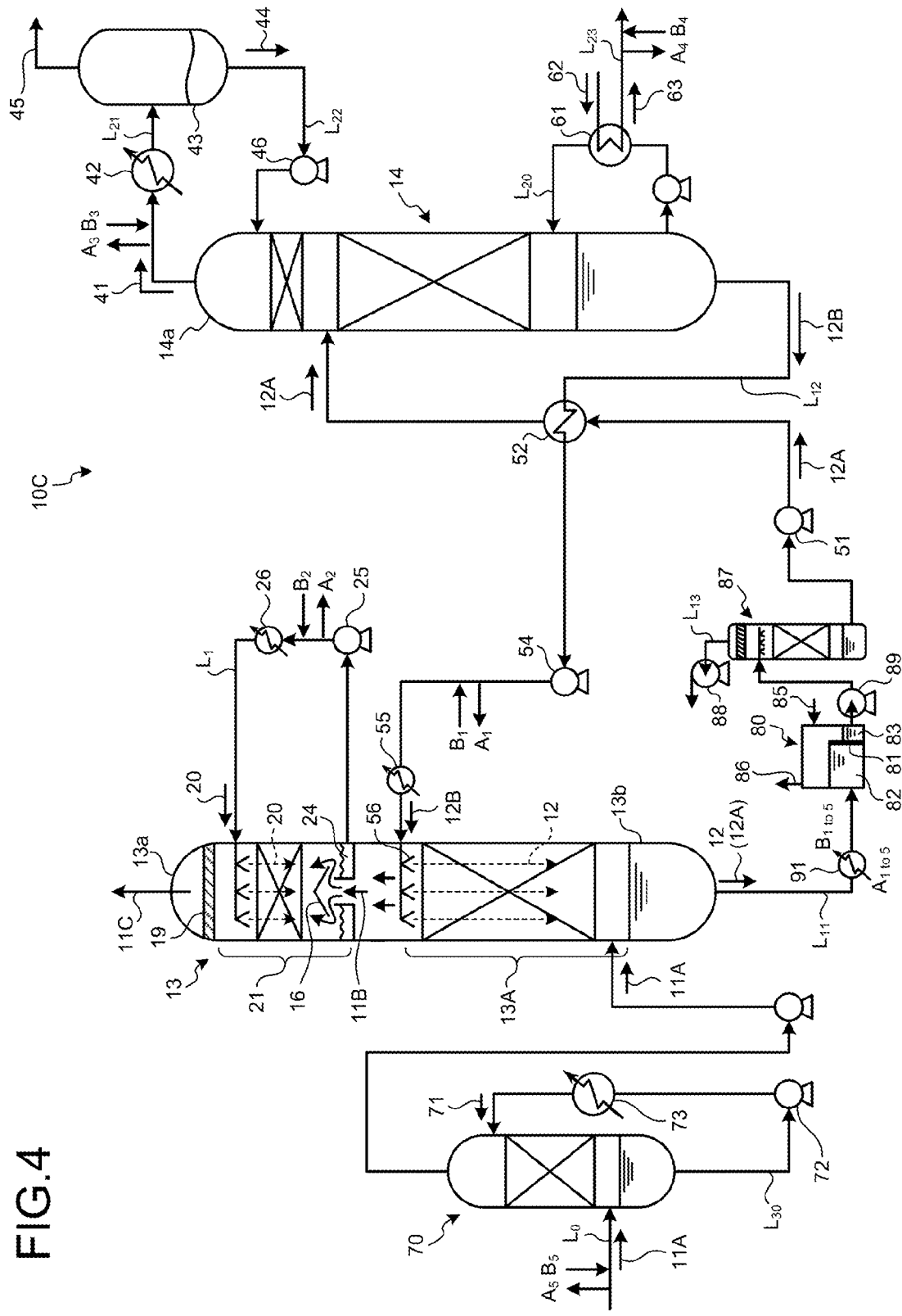
FIG. 4 is a schematic view of a $CO_2$ recovery device according to Example 3.

A $CO_2$ recovery device according to this example of the invention will be described with reference to the attached drawings. FIG. 4 is a schematic view of the $CO_2$ recovery device according to Example 3.

As illustrated in FIG. 4, a $CO_2$ recovery device 10C according to this example is further provided with a heat exchange unit 91, which heats the rich solution 12A that is withdrawn from the tower bottom portion 13b, between the absorber 13 and the degassing basin 80 in comparison to the $CO_2$ recovery device 10B of Example 2 illustrated in FIG. 3.

The rich solution 12A, which is withdrawn, is heated to a predetermined temperature in the heat exchange unit 91 to reduce viscosity of the rich solution 12A. As a result, flotation separation efficiency of air bubbles from the rich solution 12A, in which the viscosity is reduced, is improved.

Here, a temperature of the rich solution 12A, which is withdrawn from the tower bottom portion 13b, is different in accordance with operation conditions of the $CO_2$ recovery device 10C or a type of the absorbent, but it is preferable that heating be performed in such a manner that a temperature of the rich solution heated by the heat exchange unit 91 becomes, for example, 50° C. to 60° C.

This is for the following reasons. In a case of a temperature of 50° C. or less, it enters a turbidity state, and thus this is not preferable for floatation separation of air bubbles. On the other hand, in a case of a temperature higher than 60° C., $CO_2$ emission occurs from the rich solution 12A, and thus this case is not preferable.

When the heat exchange unit 91 is provided to heat the rich solution 12A to a predetermined temperature, the viscosity of the solution decreases. As a result, during retention in the retaining section 82 of the degassing basin 80 for a predetermined time, a migration speed of air bubbles that remain inside the rich solution 12A increases, and thus degassing efficiency is further improved.

In addition, in this example, the degassing tower 87 is provided, but the degassing tower 87 may not be provided.

As first to fifth heat exchange media $A_{1\ to\ 5}$ in the heat exchange unit 91, heat that is generated in the $CO_2$ recovery device 10C may be used.

In this example, heat exchange is performed by using heat extracted from five sites.

The first heat exchange medium $A_1$ that is supplied to the heat exchange unit 91 is emitted from the lean solution supply line $L_{12}$ on a downstream side of the lean solution pump 54, and a heat exchange medium $B_1$ after heat exchange is returned to a downstream side in relation to the emission side of the lean solution supply line $L_{12}$.

The second heat exchange medium $A_2$ that is supplied to the heat exchange unit 91 is extracted from the circulation rinsing water line $L_1$ on a downstream side of the circulation pump 25, and heat exchange medium $B_2$ after heat exchange is returned to a downstream side in relation to the extraction side of the circulation rinsing water line $L_1$.

The third heat exchange medium $A_3$ that is supplied to the heat exchange unit 91 is extracted from the gas discharge line $L_{21}$ on an upstream side of the cooling unit 42, and heat exchange medium $B_3$ after heat exchange is returned to a downstream side in relation to the extraction side of the gas discharge line $L_{21}$.

The fourth heat exchange medium $A_4$ that is supplied to the heat exchange unit 91 is emitted from the discharge line $L_{23}$ of the water vapor condensed water 63, and heat exchange medium $B_4$ after heat exchange is returned to a downstream side in relation to the emission side of the discharge line $L_{23}$ of the water vapor condensed water 63.

The fifth heat exchange medium $A_5$ that is supplied to the heat exchange unit 91 is emitted from a gas introduction line $L_0$ that introduces the $CO_2$-containing flue gas 11A, and heat exchange medium $B_5$ after heat exchange is returned to a downstream side in relation to the emission side of the gas introduction line $L_0$.

REFERENCE SIGNS LIST 10A to 10C $CO_2$ RECOVERY DEVICE
11A $CO_2$-CONTAINING FLUE GAS
11B DECARBONATED FLUE GAS
12 $CO_2$ ABSORBENT
12A RICH SOLUTION
12B LEAN SOLUTION
13 $CO_2$ ABSORBER
13A $CO_2$ ABSORBING SECTION
20 RINSING WATER
21 AQUEOUS CLEANING SECTION
80 DEGASSING BASIN
87 DEGASSING TOWER
91 HEAT EXCHANGE UNIT

The invention claimed is:
1. A $CO_2$ recovery device, comprising:
a $CO_2$ absorber including a $CO_2$ absorbing section in which a flue gas and a basic amine compound absorbent are brought into contact with each other to allow $CO_2$ in the flue gas to be absorbed in the basic amine compound absorbent, and an aqueous cleaning section in which a decarbonated flue gas, from which $CO_2$ is already removed in the $CO_2$ absorbing section, and rinsing water are brought into contact with each other to remove an accompanying substance that accompanies the decarbonated flue gas, and an absorbent regenerator that separates $CO_2$ from a rich solution to which $CO_2$ is already absorbed, and regenerates the basic amine compound absorbent into a lean solution, wherein the lean solution from which $CO_2$ is already removed is re-used as the basic amine compound absorbent in the $CO_2$ absorber; and a degassing basin that is interposed in a rich solution supply line that supplies the rich solution from the $CO_2$ absorber to the absorbent regenerator, wherein the degassing basin includes the retaining section that retains the rich solution for a predetermined time and is configured to separate oxygen in the rich solution by floating separation, a partition wall that allows the rich solution, from which oxygen is flotation separated in the retaining section, to gravity fall along a wall surface thereof and is configured to remove oxygen, and a storage section that stores the rich solution which falls along the partition wall and from which oxygen is removed.

2. The $CO_2$ recovery device according to claim 1, further comprising:

a purge gas introducing unit that purges a gas, which does not contain oxygen, into a space of the degassing basin.

3. The $CO_2$ recovery device according claim 1, further comprising:

a degassing tower that is provided on a downstream side of the degassing basin, and further degasses the rich solution, from which oxygen is removed, in a decompressed state.

4. The $CO_2$ recovery device according to claim 1, further comprising:

a heat exchange unit that is provided on an upstream side of the degassing basin, and heats the rich solution.

* * * * *